United States Patent [19]

Guman

[11] 4,258,748
[45] Mar. 31, 1981

[54] OPERATING ARMS FORMING PART OF LINE VALVES

[76] Inventor: Isaac A. Guman, 1702 Ciudadela, Rivadavia 11962, Buenos Aires, Argentina

[21] Appl. No.: 30,553

[22] Filed: Apr. 16, 1979

[30] Foreign Application Priority Data

Apr. 17, 1978 [AR] Argentina ............................. 271805
Sep. 21, 1978 [AR] Argentina ............................. 273797

[51] Int. Cl.³ .......................................... F16K 37/00
[52] U.S. Cl. ................................................ 137/553
[58] Field of Search ...................... 137/553, 555, 556.6

[56] References Cited

U.S. PATENT DOCUMENTS

| D.160,365 | 10/1950 | Brumbaugh | 137/573 X |
|---|---|---|---|
| 557,147 | 2/1897 | Paul | 137/553 X |
| 824,163 | 6/1906 | Whitney | 137/553 X |
| 1,003,131 | 9/1911 | Bellingrath | 137/553 X |
| 1,407,817 | 2/1922 | Renshaw et al. | 137/553 X |
| 1,984,510 | 12/1934 | Allen et al. | 137/553 X |

*Primary Examiner*—William R. Cline
*Attorney, Agent, or Firm*—Emory L. Groff, Jr.

[57] ABSTRACT

An operating lever for opening and closing line valves is of generally rectangular shape and includes a body which is connected at one end to the stem of the line valve and is provided with a recess therein. The bottom wall of the recess has inscribed thereon a legend indicating one position of the valve and a freely rotatable rocker element pivoted on the body and mounted in the recess overlies the bottom wall and also has a legend thereon indicating another position of the valve. An aperture in the top wall of the recess is closed by a transparent window for observing the legends. When the lever is mounted in a vertical position and rotated, the rocker element will fall by gravity to expose the legend on the bottom wall or alternatively cover the legend on the bottom wall to show the open or closed position of the valve. When the lever is mounted horizontally on a valve body, the rocker element is provided with an arm which extends through an opening in the body of the lever and engages an abutment attached to the valve body when the lever is in a first position. In the second position of the lever, the rocker element is moved by means of a spring away from the first position so as to expose the legend on the bottom wall of the lever body.

11 Claims, 11 Drawing Figures

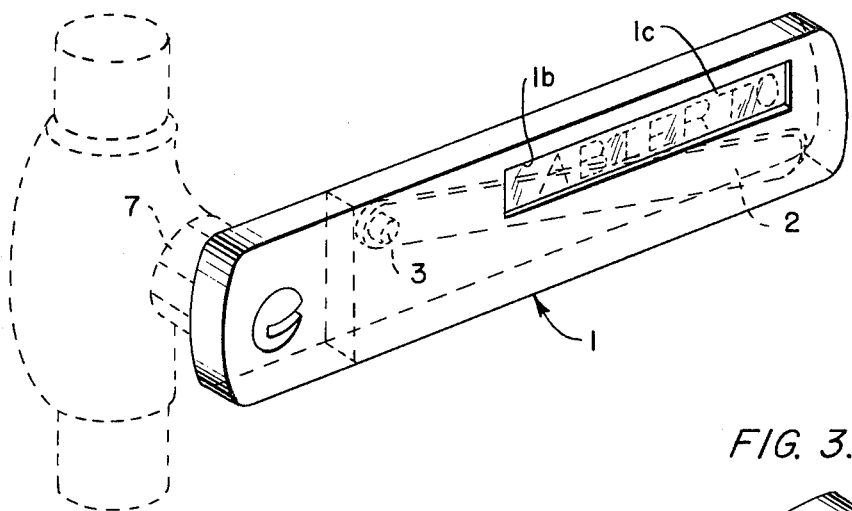
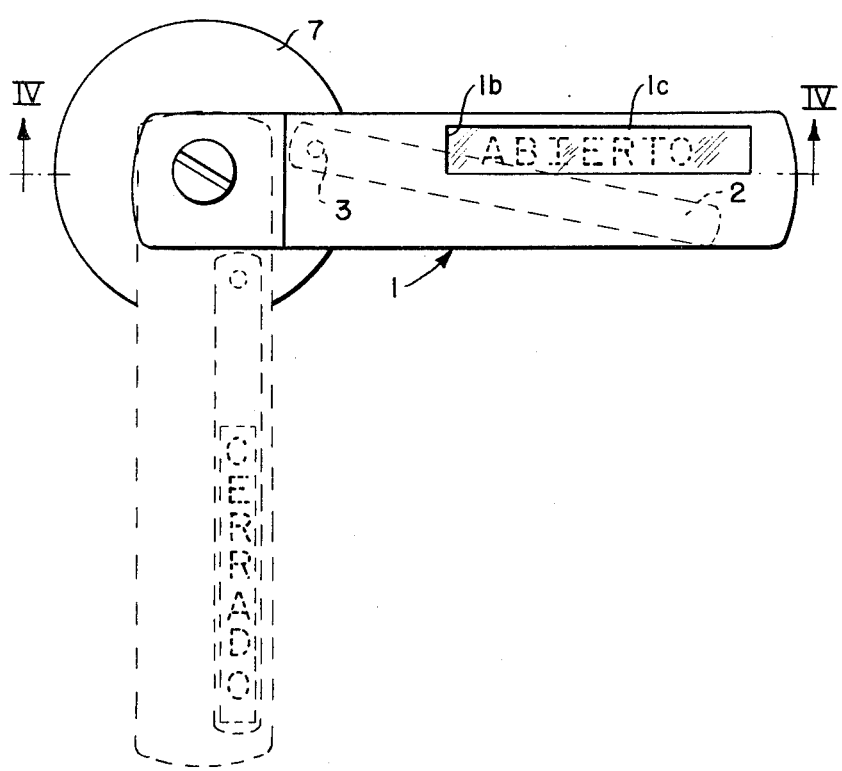
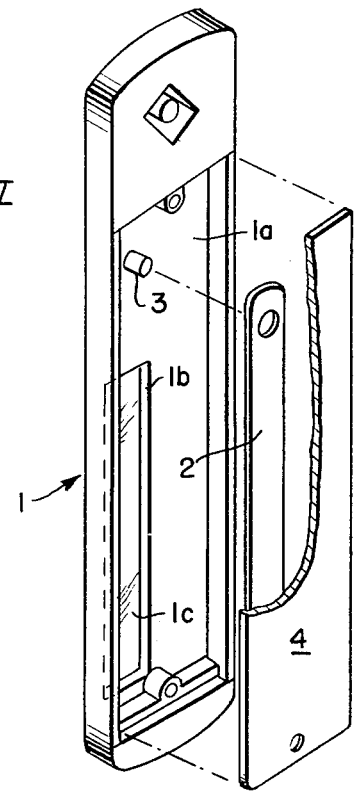
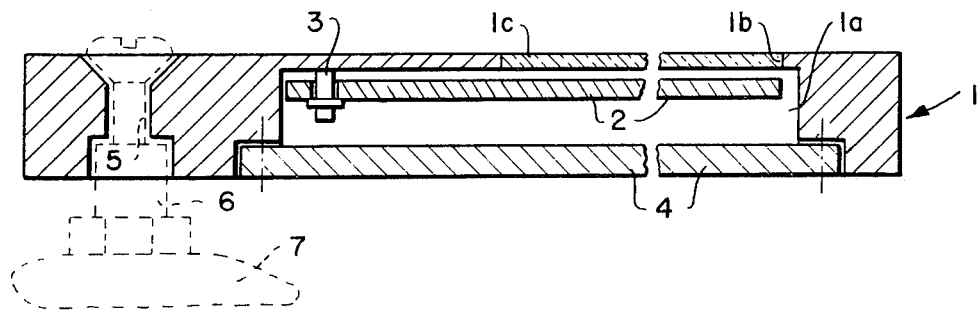

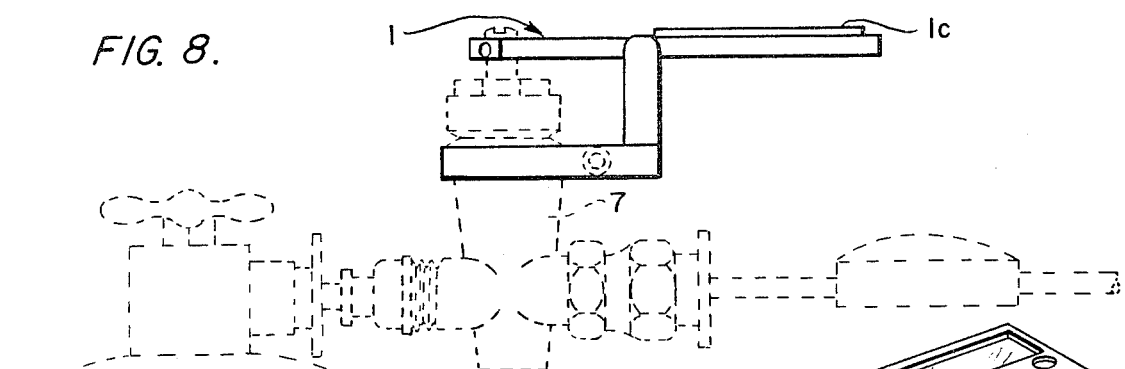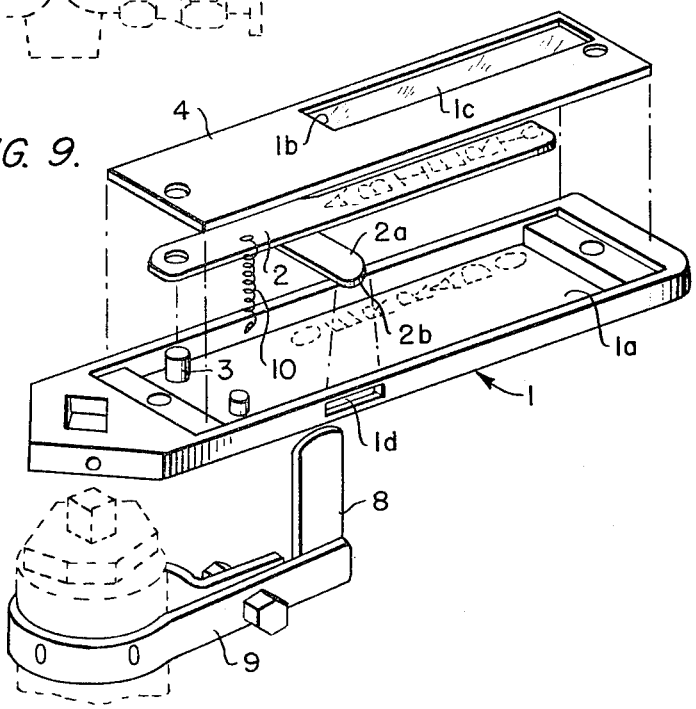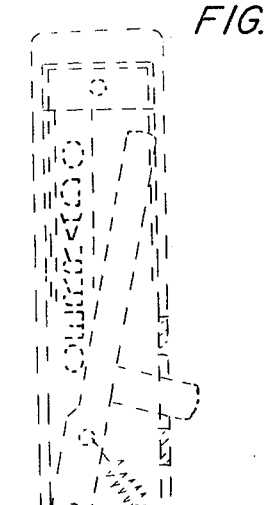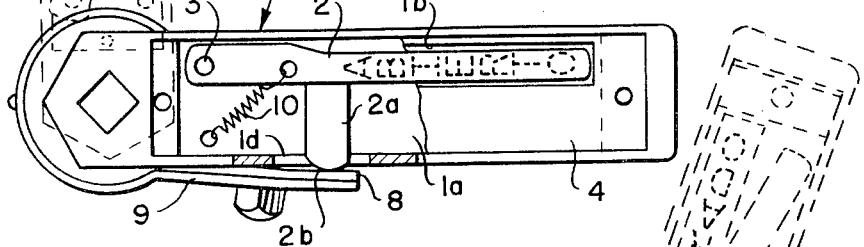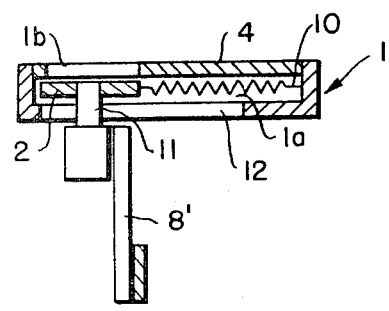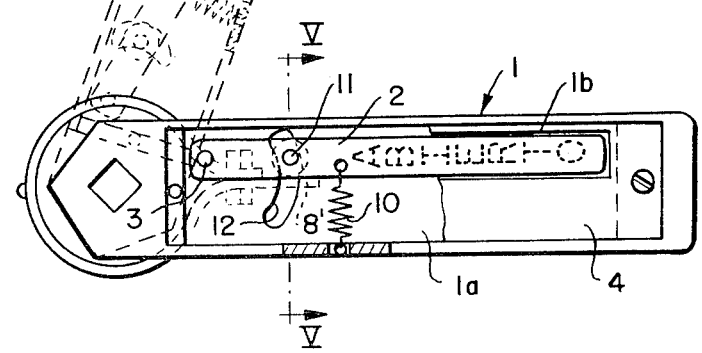

OPERATING ARMS FORMING PART OF LINE VALVES

BACKGROUND OF THE INVENTION

The present invention refers to improvements in valves installed in pipelines used for conducting various fluids, preferably natural or manufactured gas used for domestic lighting and heating. In particular, the invention refers to improvements in the operating levers provided for such valves, the purpose of such improvements being to provide advantageous means for determining visually and immediately the open, partially open or closed position of such valves, thus avoiding losses which could lead to serious accidents.

The commonly called "quarter turn line valves" are well known. The term "quarter turn" is used because the valve stem only rotates 90° between a closed and open position. Such valves are applied to pipelines for conducting gaseous fluids which are easily inflammable and regarding which it is important that the user be fully aware of the position, whether open or closed, of the line valve. An open or improperly closed valve is a great source of danger inasmuch as the resulting losses may not be discovered immediately and can lead to accidents.

It is generally known that in the so-called "quarter turn" valves the operating lever is disposed vertically for the closed position of the valve and said lever is disposed horizontally for the open position of the valve. Certain users, it has been commonly found, do not locate said operating lever correctly in the closed or open positions leading to loss of the gaseous fluid. So far, no means have been developed permitting an immediate visual indication as to whether or not the lever is properly situated for each operative position thereof.

SUMMARY OF THE INVENTION

In order to solve these difficulties, the present invention has as its primary object an improved lever for operating said valves by incorporating in the lever means which, by means of readily visible indicia, will enable the user to ascertain whether said member is correctly placed in an open or closed position. To this end, the usual structural features of the lever have been substantially modified by providing a rocker element pivotally mounted within a recess formed in said lever. This element, in combination with a peep hole provides a clear and distinct view for the operator of the legends or signs indicating the open or closed position of the valve. It is thus possible for the operator to determine with certainty the exact location of said lever and in this manner to avoid the aforementioned danger of leakage of the gaseous fluid.

The lever comprises an elongated body having a recess extending over part of its length in order to define therein a cavity limited by planar surfaces which are parallel to one another. One of said surfaces corresponds to the exposed face of the lever and adjacent to one of the longitudinal edges of the body of the lever, an aperture is provided therein serving as a peep hole. The aperture overlies a legend indicating one of the positions of the valve which is inscribed on the background surface of said cavity facing the aperture. Inside the cavity, an element is mounted to rock or rotate about a shaft extending transversely of said body. This element is provided with a second legend indicating another of the operative positions of said valve and is capable of being positioned selectively through gravity with relation to aforesaid aperture and in response to an angular displacement of the arm.

The present invention, in a first embodiment, provides a lever having a rocker element consisting of a single flat plate pivotally mounted in a recess in the lever body adjacent the end of the lever which is connected to the valve stem. A peep hole aperture for observing the indicating legends is provided in the free end portion of said lever.

In the second embodiment of the present invention, said peep hole aperture is provided adjacent one of the longitudinal edges of the lever and over a portion close to the end at which the lever is pivoted to the valve stem. The rocker element, in turn is pivoted on a shaft which is out of phase with relation to said aperture and is arranged in the free end of the arm. Said element comprises two flat plates pivotally connected to one another.

In the third embodiment of the invention, the rocker element comprises two flat plates pivotally connected to one another and to a shaft adjacent or close to the end of the lever which is pivoted to the valve. This embodiment allows one of the portions of the rocker element, while said lever is rotating, to register with said peep hole aperture located in the free end portion of said lever.

In the fourth embodiment of the invention, the lever having the rocker element with the indicating legends can be located in a horizontal position. The purpose of this arrangement is to enable the lever to be used in certain applications of the valve requiring this position. A particularly illustrative example is the case of portable gas containers, the valves of which present certain difficulties inasmuch as it is not possible to ascertain immediately whether such a valve is in open or closed position. This condition can cause the user serious trouble.

In the manner shown according to the present invention it is possible to avoid the inconveniences arising from the prior art embodiments, the drawbacks of which are due to the fact that the lever must be positioned in a vertical plane in order that the aforesaid rocker element may move due to gravity, it not being possible to actuate said element when the lever is in a horizontal position.

The application of the fourth embodiment would correct this deficiency. In fact, the position given here to the rocker element of said lever shows immediately whether said container is closed or is leaking through its value. To accomplish this, said rocker element is provided with legends and an arm which passes outwardly through the body, where it faces an abutment member arranged at one end of the valve body. The rocker element engages the abutment in one of the end positions of the lever when it is rotated against the force exerted by a traction spring connecting said rocker element with the aforementioned lever.

These and other objects and advantages of the present invention will become apparent to those skilled in the art from consideration of the following detailed description of the preferred embodiment thereof, with reference to the accompanying drawings.

BRIEF DESCRIPTION OF THE DRAWINGS

FIG. 1 is a perspective view of the improved operating lever as applied to a line valve;

FIG. 2 is a front view of the lever showing the two working positions, open and closed, of a line valve with the closed position being indicated in dotted lines;

FIG. 3 is an exploded perspective view of the improved lever;

FIG. 4 is a section along line IV—IV of FIG. 2;

FIG. 7 is an embodiment wherein the operating lever is mounted in a horizontal position rather than a vertical position as shown in the preceding FIGS;

FIG. 8 is a diagrammatic side view of a valve provided with the lever shown in FIG. 7 as applied to a portable gas container;

FIG. 9 is an exploded perspective view of the lever shown in FIG. 7;

FIG. 10 is a view of a modification of the arm illustrated in FIG. 7; and

FIG. 11 is a cross-section along line V—V of FIG. 10.

Similar reference characters represent the same or similar parts throughout the several FIGS. of the drawings.

DESCRIPTION OF THE PREFERRED EMBODIMENT

Figure 5:
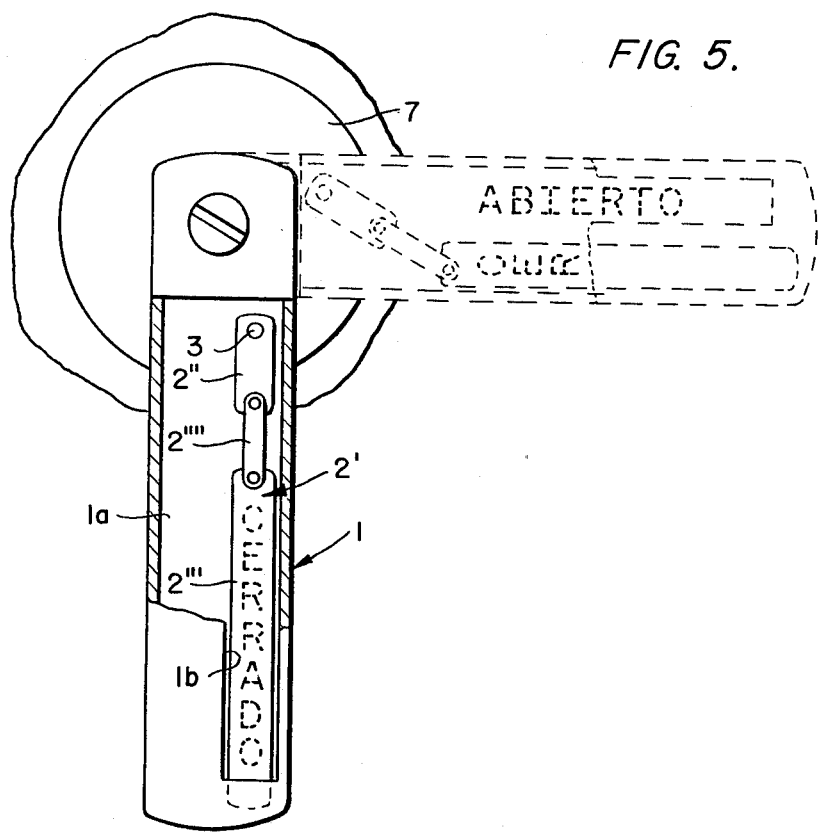
FIG. 5 is a front view similar to FIG. 2 wherein the rocker element is modified to comprise a pair of plate portions pivotally connected by a link.

In a preferred embodiment, the operating lever according to the invention includes, a rigid body 1, preferably of rectangular shape, although other shapes can serve equally as well. One of the faces of the lever body is provided with a recess 1a, the bottom wall of which, at one end thereof, is provided with an aperture 1b, also rectangularly shaped but off-center with relation to the longitudinal axis of said body and exposed to the user of the valve.

In the interior of the cavity or recess 1a of body 1, a rocker element is mounted and comprises in this first embodiment, an elongated, rectangular plate or element mounted on a pivot shaft 3 located in one end of said recess 1a opposed to the end where aperture 1b is mounted.

This aperture 1b is preferably closed by a laminate of transparent material 1c and said aperture 1b is located adjacent to the upper edge of said body 1 and opposite from a surface area of a cover 4 which closes recess 1a of said body 1 and carries the legend "OPEN" or indicia indicating said position.

In turn, rocker element 2 pivoting on said shaft 3 affixed to the bottom of recess 1a also is inscribed with a legend or indicia corresponding to "CLOSED" which cannot be seen if the valve is open inasmuch as it is hidden by the bottom wall of recess 1a.

Also, that end of said body which is connected with line valve stem 6 is provided with an orifice 5 the features of which are identical to those of the usual valve arms, so as to comply with standard requirements.

FIG. 5 shows a similar valve with the same reference characters which embodies a rocker element 2' consisting of a pair of portions 2" and 2''' pivotally joined by means of a link 2''''.

This structural modification enables portion 2''' to register exactly with aperture 1b due to the fact that when lever body 1 is displaced, it comes to rest against a sidewall of recess 1a, thus improving the operativeness of said element 2' and providing greater utilization of the space where it is mounted inasmuch as, in the case shown in FIGS. 1 through 4, the rocker element 2 being an elongated plate, is partially visible from the outside.

Figure 6:
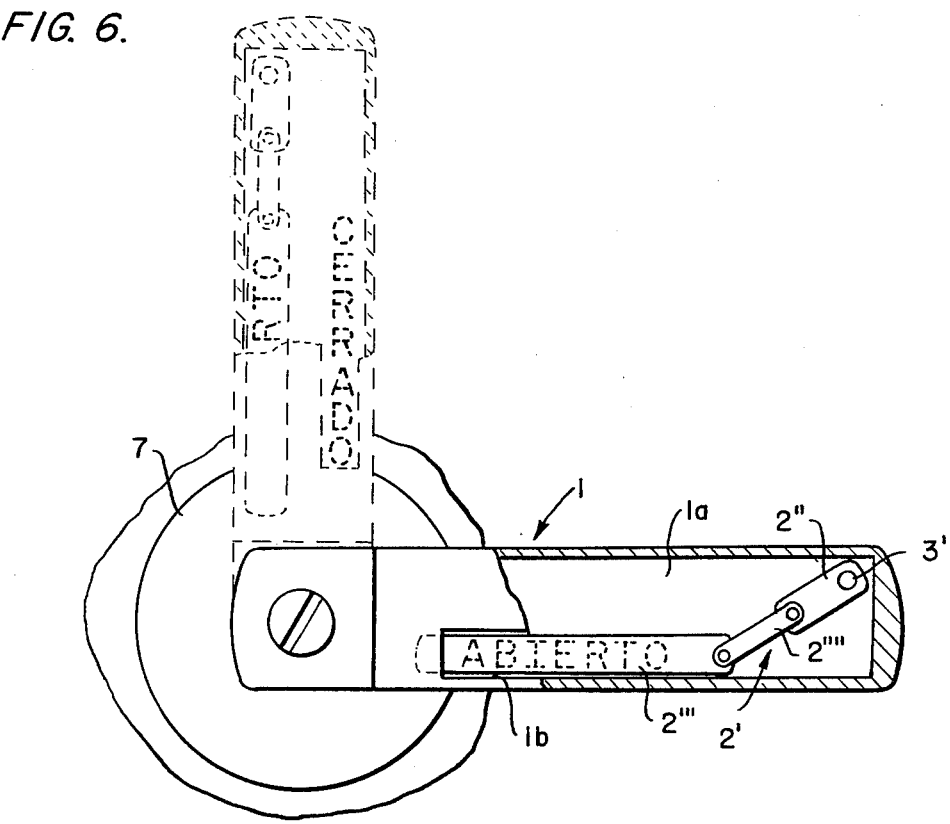
FIG. 6 is a front view similar to FIG. 5 except that the rocker element is pivotally mounted at the free end of the lever.

FIG. 6 shows another modification of lever body 1, wherein it is used with those valves in which the location of the body 1 changes position with respect to conventional installations.

In said FIGURE, aperture 1b is provided adjacent to one of the edges of the body and above a portion thereof adjacent to its connection with the valve stem.

In turn, rocker element 2' is pivoted on shaft 3 and is arranged in the free end of the body 1 out of line with regard to the aperture 1b.

The manner in which said arm is used and assembled in the various embodiments illustrated, is effected as follows:

Lever body 1, by means of its orifice 5, is placed on the end of stem 6 on the line valve 7 in such a manner as to occupy a vertical position in its entirety, taking care that it corresponds to the closing position of the valve (FIGS. 1 through 5).

Due to gravity, the rocker element 2 and 2', freely pivoting on shaft 3, will also occupy a vertical position registering with aperture 1b in body 1, thus exposing the legend "CLOSED" inscribed in the surface of said rocker element or any other sign or graphical representation indicating the disconnected position of the valve 7 and in this manner covering the legend "OPEN" inscribed on cover 4 of body 1. In the illustration of FIG. 6, the legend "CLOSED" is provided in the bottom of the cavity or recess 1a and the legend "OPEN" is on the rocker element 2', both legends facing another in an open position of the valve.

When body 1 is turned in a quarter rotation and due to the same effect of gravity, the rocker element 2 and 2' will tend to rotate until coming to rest against the wall of cavity or recess 1a of body 1, thus uncovering the legend "OPEN" inscribed on cover 4, as can be seen in FIGS. 1 and 5. Consequently, that portion of element 2 and 2' which carries the legend "CLOSED" is hidden by the bottom area of recess or cavity 1a, located beneath aperture 1b. The same thing happens with the legends of FIG. 6.

It should be noted that the inherent features of said control or operating lever do not permit the incorrect positioning of said lever i.e., its location in positions which do not complete the full closure of the line valve.

In fact, when said line valve is insufficiently closed, element 2 or 2' will not register with aperture 1b thus not entirely covering the legend "OPEN" or "CLOSED" of FIG. 6. This signals the user to correct said position in order to avoid losses of gaseous fluid which normally are difficult to locate.

In the embodiment shown in FIGS. 7, 8 and 9, the operating lever also includes a rigid body 1 and is applied to a line valve of the same so-called "quarter turn" type previously referred to.

From FIGS. 7, 8 and 9, it will be noted that recess or cavity 1a is longitudinally arranged in said rigid body 1. The peep hole aperture 1b is covered or closed by a transparent lamination 1c and a rocker element 2 is lodged within said cavity 1a. Said rocker element consists of a stiff, rectangular plate, as in the case of FIGS. 1 through 4 and its end is pivoted to shaft 3 affixed to rigid body 1, said cavity or recess being closed by means of a cover 4 on which is inscribed the legends "OPEN" and "CLOSED", arranged on the exposed face of rocker element 2 and the bottom surface of cavity or recess 1a, respectively.

In this embodiment, said aperture 1b is provided in the surface of cover 4 and in fixed relation with said rocker element 2, an arm 2a of rocker element 2 is extended perpendicularly thereto, at one of the longitudinal edges thereof. This arm 2a extends outwardly in such a manner so as to pass through aperture 1d provided in the side wall of the cavity or recess 1a. The outer end 2b of arm 2a faces abutment 8 attached by means of a clamp 9 to the body of valve 7. Furthermore, the rocker element 2 is resiliently connected with body 1 by means of an extension coil spring 10 located in such a manner that in the stretched position of the spring it displaces the rocker element 2 and positions the latter diagonally with respect to the cavity or recess 1a, arm 2a passing through to the outside as shown in dotted lines in FIG. 7.

FIGS. 10 and 11 illustrate a modification of the embodiment shown in FIGS. 7 and 9, wherein the arm comprises a pin 11 affixed to the hidden face of the rocker element 2 facing the bottom of cavity or recess 1a and passes outwardly through the arc-shaped aperture 12 provided in the bottom of said cavity 1a, said pin 11 remaining in a position facing abutment 8' affixed in the same manner as in FIGS. 7 and 9.

The use and operation of this modification is very simple and takes place as follows;

The valve being closed, as illustrated in dotted lines in FIGS. 7 and 10, the arm 2a and pin 11 being separated from abutment 8 and abutment 8' respectively, spring 10 is released and positions rocker element 2 diagonally, thus uncovering the legend "CLOSED" inscribed on the bottom of recess or cavity 1a and visible through transparent lamination 1c.

When the valve is rotated a quarter of a turn, in order to open same, the arm 2a or pin 11 engages and abuts against aubtment 8 or 8', thus exerting gradual thrust against rocker element 2 to the degree that the arm completes its turn until said element 2 covers the legend "CLOSED" on the bottom of cavity 1a and at the same time loading spring 10. The legend "OPEN" on the exposed face of element 2 becomes visible through the peep hole as the rocker element 2 is brought into registry with said peep hole.

When the valve is closed, as it is gradually being turned, by lever body 1, spring 10 gradually unloads and causes element 2 to rotate up to the starting position.

While I have described in detail what I believe to be the preferred form of my invention, it will be understood by those skilled in the art, that the invention is not limited to such details, but may take various other forms within the scope of the appended claims.

I claim:

1. In an operating lever for a line valve used in pipelines conducting gaseous fluids, said valve including a body and a stem, said operating lever including an elongated body having a front surface facing the operator of the valve and a rear surface opposite said front surface and parallel thereto, said lever body rotatably connected at one end of said valve stem the opposite end being free, the improvement wherein said lever body is provided with a recess extending throughout a portion of its length between said front and rear surfaces, said rear surface having a legend thereon facing said front surface and indicating one position of said operating lever, said front surface having an aperture therein aligned with the legend on said rear surface, a shaft mounted on the inner face of said front surface perpendicular thereto and within said recess, a rocker element pivotally mounted on said shaft, said rocker element having an upper surface said aperture and a lower surface, said rocker element upper surface provided with a legend thereon indicating another position of said operating lever whereby, upon rotation of said operating lever, said rocker element is either moved into registry with said aperture to expose the legend on the upper surface of said rocker element or out or registry with said aperture to expose the legend on the rear surface of said lever to provide the operator of the line valve with a visual indication of one position or another position thereof.

2. An operating lever according to claim 1 wherein, said lever is mouned vertically relative to said line valve and moves from one said position to the other said position by gravity.

3. An operating lever according to claim 1 including, a transparent window secured in said aperture.

4. An operating lever according to claim 1 wherein, said aperture is located at the free end of said lever body and said shaft is located adjacent the end of said lever body which is attached to said valve.

5. An operating lever according to claim 1 wherein, said aperture is located adjacent the end of said lever body which is attached to said valve and said shaft is located at the free end of said lever body.

6. An operating lever according to claim 1 wherein, said rocker element is of substantially rectangular shape and is as wide as said aperture.

7. An operating lever according to claim 1 wherein, said rocker element comprises a pair of substantially rectangular plates, a link connecting said plates to one another, one of said plates pivoted on said shaft and the other plate bearing said legend.

8. An operating lever according to claim 1 wherein, said rear surface and rocker element bear legends corresponding to the open and closed positions of the valve respectively.

9. An operating lever according to claim 1 wherein, said rocker element includes an arm extending perpendicular thereto and projecting through said lever body, an abutment member fixed on the body of said valve and disposed opposite said arm which it engages when said rocker element is in one of its said positions and a spring connected at one end to said rocker element and connected at its other end to said lever body to move said rocker element to the other of said positions.

10. An operating lever according to claim 9 wherein, said arm is on a side edge of said rocker element and extends through an aperture in the side wall of said recess.

11. An operating lever according to claim 9 wherein, said arm comprises a pin fixed to the face of the rocker element opposite the rear surface and passes through an opening in said rear surface and is disposed opposite said abutment fixed to the body of said valve.

* * * * *